(12) United States Patent
Geiger et al.

(10) Patent No.: US 8,511,718 B2
(45) Date of Patent: Aug. 20, 2013

(54) ANTI-TORQUE PLATE FOR A GAS MANIFOLD PIPE CONNECTION

(75) Inventors: Joseph Geiger, Trent Woods, NC (US); Michael Gerdes, New Bern, NC (US); Mark Wood, New Bern, NC (US); Anthony Zymroz, Jr., Trenton, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 279 days.

(21) Appl. No.: 12/787,436

(22) Filed: May 26, 2010

(65) Prior Publication Data

US 2011/0291403 A1   Dec. 1, 2011

(51) Int. Cl.
*F16L 41/00* (2006.01)

(52) U.S. Cl.
USPC ........................................ 285/208; 285/124.2

(58) Field of Classification Search
USPC .................. 285/134.1–135.5, 208, 189, 192, 285/124.2–124.4; 411/482, 401
See application file for complete search history.

(56) References Cited

U.S. PATENT DOCUMENTS

| | | | | |
|---|---|---|---|---|
| 5,248,167 A | * | 9/1993 | Petrich et al. | 285/23 |
| 5,333,917 A | * | 8/1994 | Davey et al. | 285/205 |
| 5,556,138 A | * | 9/1996 | Nakajima et al. | 285/124.4 |
| 6,016,843 A | * | 1/2000 | Wada et al. | 138/109 |
| 6,062,245 A | | 5/2000 | Berglind et al. | |
| 6,082,397 A | | 7/2000 | Casolari et al. | |
| 6,170,515 B1 | * | 1/2001 | Peterson et al. | 137/271 |
| 6,371,057 B1 | | 4/2002 | Henderson | |
| 6,516,741 B1 | * | 2/2003 | Sorum et al. | 116/137 R |
| 6,722,356 B2 | | 4/2004 | Distaso | |
| 6,869,107 B2 | * | 3/2005 | Schroeder et al. | 285/205 |
| 7,089,761 B2 | * | 8/2006 | Nungesser | 62/527 |
| 7,322,616 B2 | | 1/2008 | Lang | |
| 2006/0279081 A1 | * | 12/2006 | Liao | 285/124.2 |

* cited by examiner

*Primary Examiner* — Aaron Dunwoody
(74) *Attorney, Agent, or Firm* — James E. Howard; Andre Pallapies

(57) ABSTRACT

A pipe and connector assembly of an appliance is provided. The assembly has a pipe for connecting to a fluid system of the appliance; a transition section fluidly connected to the pipe; a connector portion for connecting to the external fluid supply by way of a twisting motion between the external fluid supply and the connector portion; an anti-torque plate fixed rigidly to the transition section, the anti-torque plate having an engagement area; and a shoulder element for attaching the anti-torque plate to a chassis of the appliance. A shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along a length of the shoulder portion.

20 Claims, 2 Drawing Sheets

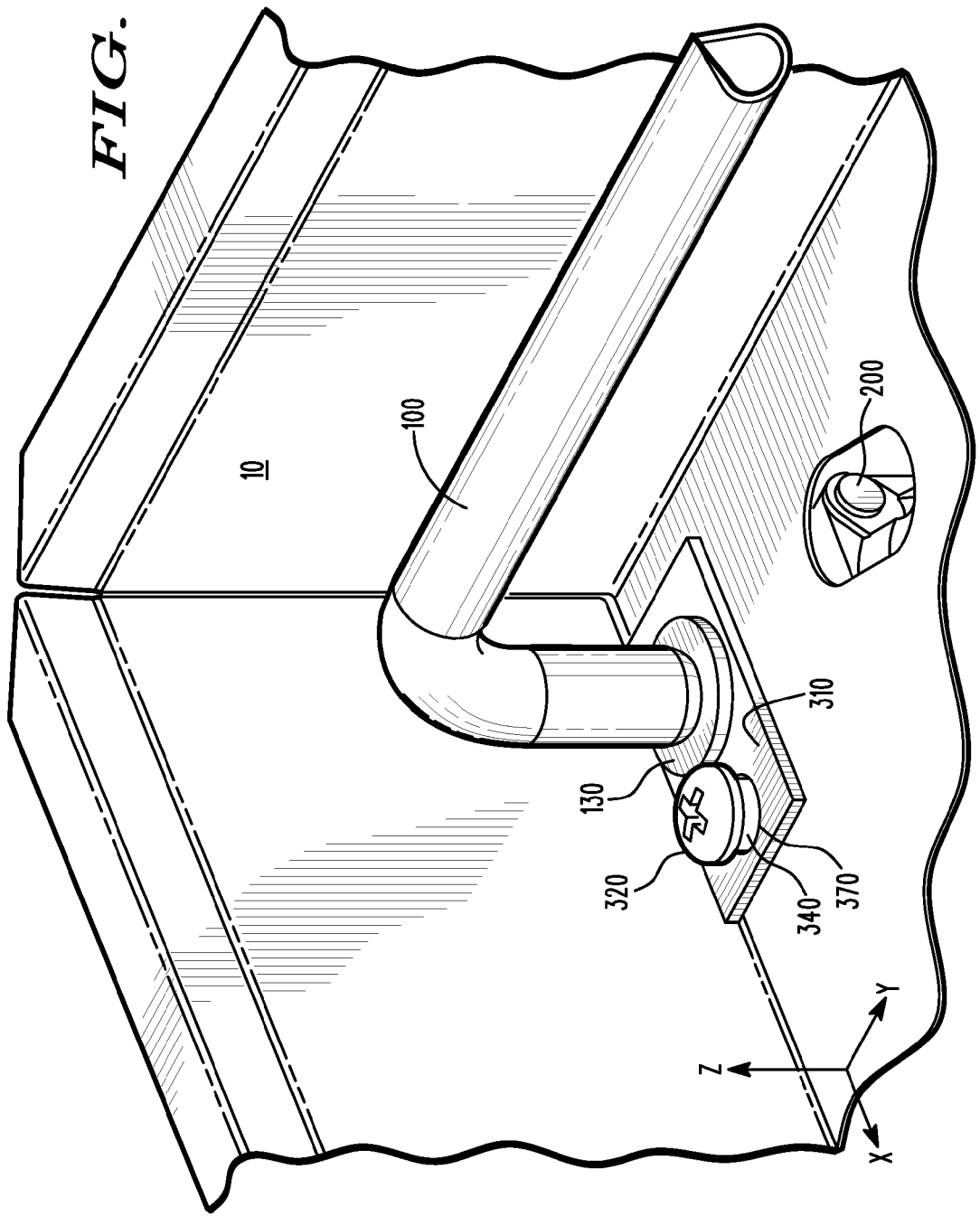

ANTI-TORQUE PLATE FOR A GAS MANIFOLD PIPE CONNECTION

FIELD OF THE INVENTION

The invention is directed to an anti-torque plate for a pipe connection, and, more particularly, to an anti-torque plate that allows a gas pipe to be connected to a floating attachment point while preventing a manifold rigidly connected to the attachment point from being subjected to torque beyond a predetermined amount.

An example of an application for the invention is the attachment of a gas supply line to a floating gas manifold in a household appliance.

BACKGROUND OF THE INVENTION

Many appliances, such as, for example, gas cooktops, have couplings for connecting to external fluid supplies. In the case of a household gas cooktop, a coupling is provided for connecting to a gas supply line in the house. Often, a gas regulator is connected to the coupling by a threaded connection. While some couplings are rigidly fixed to a chassis of the appliance, other couplings are preferably attached to the chassis in a way that allows some movement of the coupling relative to the chassis.

During installation of the appliance, it is necessary to attach the external fluid supply to the coupling. In the case of a threaded connection, the installer must be careful not to over torque, and therefore damage, the coupling and/or the appliance. This is particularly important in appliances where the coupling is attached to the chassis and a way that allows movement of the coupling relative to the chassis. In these cases, the coupling is not supported by the chassis during connection.

Some gas cooktops, for example, have a gas distribution manifold that distributes gas to a number of burners. The manifold is connected to a pipe that is, in turn, attached to the coupling. In some cooktops, it is desirable for the gas delivery system (the manifold, pipe and coupling) to float relative to the chassis of the cooktop so that precise alignment of the gas delivery system relative to the burners and the visible upper surface of the cooktop is simplified.

These floating gas delivery systems present a particular problem to installers because since they move relative to the chassis of the appliance, torque applied when the external gas supply (or regulator) is attached is transmitted through the coupling and the pipe to the gas distribution manifold. This can result in damage to the pipe and/or the gas distribution manifold.

SUMMARY

The invention recognizes that it is desirable to limit, or eliminate, the torque seen by internal elements, such as a floating gas delivery system, when an external fluid supply (or gas regulator) is attached to the appliance.

The invention also recognizes that it is often desirable to permit some movement of an internal element, such as a floating gas delivery system, while limiting or eliminating the torque seen by the internal element during attachment of the external fluid supply.

The invention provides a solution to the problem of damaging appliances during connection of an external fluid supply as a result of applying too much torque to the connection. Exemplary embodiments of the invention provide an anti-torque plate that prevents movement of a coupling in a plane parallel to a twisting motion used to connect the external fluid supply to the coupling, but allows movement in a direction perpendicular to that plane. For example, for a coupling of a pipe that vertically penetrates the chassis of the appliance, movement is prevented in a horizontal plane, but allowed (in a limited amount) in the vertical direction.

Particular embodiments of the invention are directed to a pipe and connector assembly of an appliance for connecting the appliance to an external fluid supply. The assembly has a pipe for connecting to a fluid system of the appliance; a transition section fluidly connected to the pipe; a connector portion for connecting to the external fluid supply by way of a twisting motion between the external fluid supply and the connector portion, the connector portion being fixed to the transition section; an anti-torque plate fixed rigidly to the transition section, the anti-torque plate having an engagement area; a shoulder element for attaching the anti-torque plate to a chassis of the appliance, the shoulder element having a head, a shoulder portion adjacent to the head, the shoulder portion having a length along a longitudinal direction of the shoulder element, and a connection portion adjacent to the shoulder portion; and a fastener that engages the connection portion for connecting the shoulder element to the appliance chassis. The shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion.

Other embodiments of the invention are directed to an appliance for connecting to an external fluid supply. The appliance has a chassis; a fluid distribution manifold held in the chassis such that the manifold can move relative to the chassis, the movement of the manifold relative to the chassis being limited to a predetermined amount; a pipe and connector assembly for connecting the appliance to the external fluid supply, the assembly having a pipe connected to the manifold, a transition section fluidly connected to the pipe, a connector portion for connecting to the external fluid supply by way of a twisting motion between the external fluid supply and the connector portion, the connector portion being fixed to the transition section, an anti-torque plate fixed rigidly to the transition section, the anti-torque plate having an engagement area, a shoulder element that attaches the anti-torque plate to the chassis, the shoulder element having a head, a shoulder portion adjacent to the head, the shoulder portion having a length along a longitudinal direction of the shoulder element, and a connection portion adjacent to the shoulder portion; and a fastener that engages the connection portion to connect the shoulder element to the chassis. The shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion.

Still other embodiments of the invention are directed to a method of limiting an amount of torque applied to a pipe that is a part of an appliance during the connection of an external fluid source to the pipe. The method includes providing a transition section attached to the pipe; providing a connector portion fixed to the transition section; providing an anti-torque plate attached to the transition section such that the transition section is rigidly fixed to the anti-torque plate, the anti-torque plate having an engagement area, the transition section being fluidly connected to the pipe; attaching the anti-torque plate to a chassis of the appliance by engaging a shoulder element with the engagement area in the anti-torque plate and attaching a fastener to the shoulder element, the shoulder element having a head and a shoulder portion adjacent to the head, the shoulder portion having a length along a longitudinal direction of the shoulder element; and attaching the external fluid supply to the connector portion by way of a twisting motion between the external fluid supply and the connector portion, the connector portion being fixed to the transition section. The shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion.

BRIEF DESCRIPTION OF THE DRAWINGS

FIG. 2 is a perspective view of the exemplary embodiment shown in FIG. 1.

DETAILED DESCRIPTION

Figure 1:
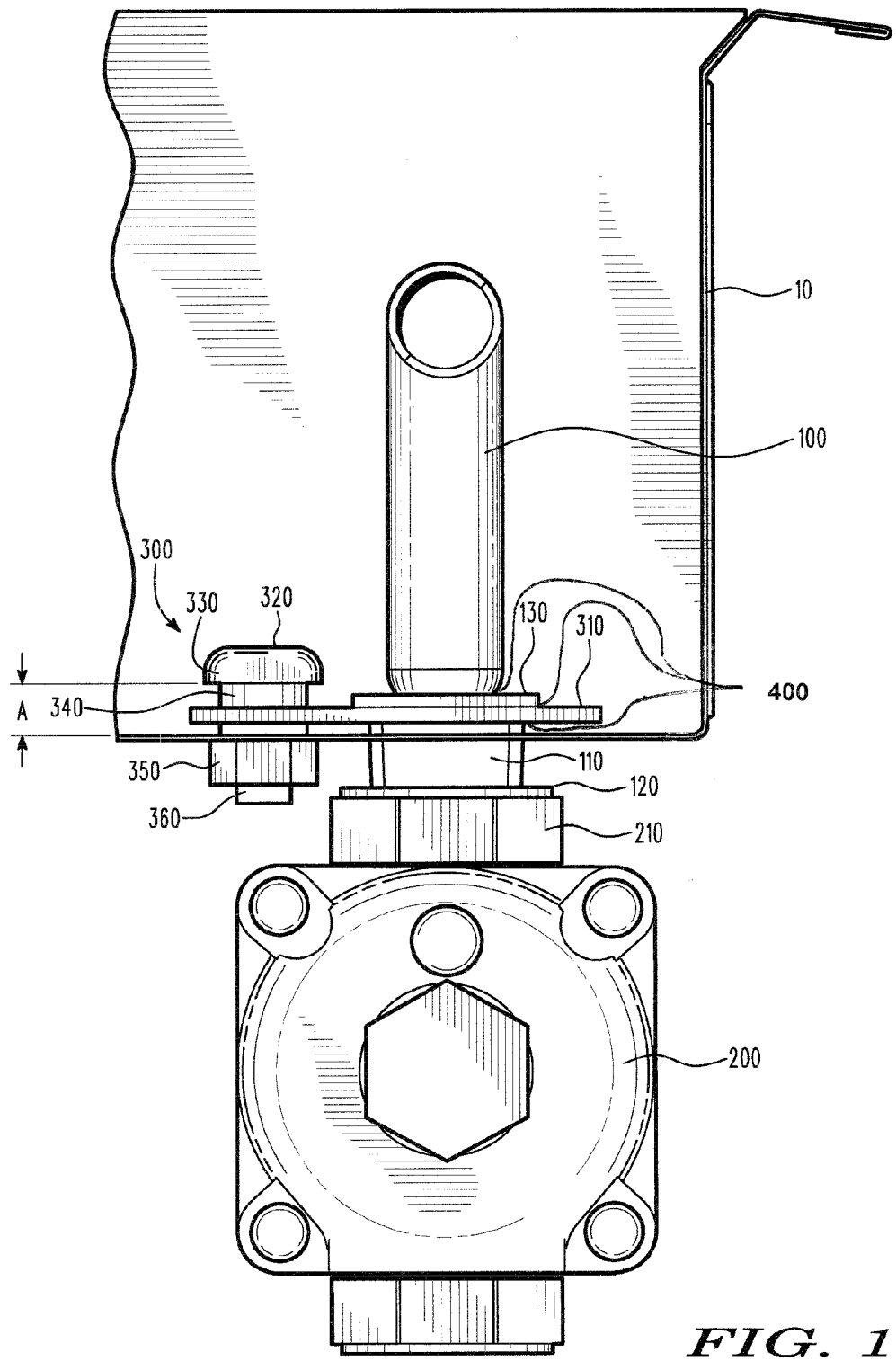
FIG. 1 is a schematic side view of an exemplary embodiment of the invention.

The invention is described herein with reference to the accompanying drawings in which exemplary embodiments of the invention are shown. The invention may, however, be embodied in many different forms and should not be construed as limited to the embodiments set forth herein.

FIGS. 1 and 2 show an example of an embodiment of the invention applied to a gas cooktop. A gas manifold pipe 100 is positioned inside a chassis 10 of the cooktop and is attached to a regulator 200 positioned outside of chassis 10. In this example, gas manifold pipe 100 is fixed to a transition section 110 that penetrates chassis 10 and has a threaded connector 120 attached thereto. Regulator 200 has a threaded connector 210 that is twisted onto threaded connector 120 to attach regulator 200 to transition section 110.

In order to allow adjustment of the final vertical position of gas manifold pipe 100 within chassis 10 (along direction z), transition section 110 must be permitted to move vertically relative to chassis 10. However, without some form of restraint in the x-y plane (shown in FIG. 2) damage can occur to gas manifold pipe 100 when regulator 200 is tightened onto threaded connector 120. This is because it can be difficult to properly hold gas manifold pipe 100 during the tightening process. In this embodiment, an anti-torque device 300 is provided to prevent gas manifold pipe 100 from moving in the x-y plane.

Anti-torque device 300 has an anti-torque plate 310 that is rigidly fixed (for example, welded) to gas manifold pipe 100 and transition section 110. In this example, a plate 130 provides additional support for the connection between anti-torque plate 310 and gas manifold pipe 100. Anti-torque plate 310 is provided with a hole 370 offset from transition section 110. When installed in chassis 10, anti-torque plate 310 is positioned so that hole 370 is located above a corresponding hole in chassis 10. A shoulder bolt 320 is positioned in hole 370 and the corresponding hole in chassis 10 and fixed to chassis 10 by a nut 350 engaging a threaded portion 360 of shoulder bolt 320. As a result, head 330 of shoulder bolt 320 is held a distance A above chassis 10. Hole 370 is sized slightly larger than the diameter of shoulder portion 340 so that anti-torque plate 310 can move vertically (along direction z) relative to shoulder portion 340. Head 330 and chassis 10 limit the vertical movement of anti-torque plate 310.

By preventing torque from being transmitted from regulator 200 (or other external device) to gas manifold pipe 100 during the connection process, the invention prevents damage to the gas delivery system, especially in the case of a floating gas delivery system.

Although the above example uses welded connections 400 between anti-torque plate 310, gas manifold pipe 100 and transition section 110, other connection methods can be used as long as threaded connector 120 is rigidly fixed to anti-torque plate 310 such that the torque seen by threaded connector 120 during the connection of regulator 200 is applied to anti-torque plate 310. For example, the connection between gas manifold pipe 100 and anti-torque plate 310 can be a flexible, rotatable, pivoting, or other type of connection because the rigid connection between transition section 110 and anti-torque plate 310 will prevent torque from being transmitted to gas manifold pipe 100.

Although the above example uses shoulder bolt 320 positioned in hole 370, other methods of preventing the rotation of anti-torque plate 310 can be used. For example, anti-torque plate 310 can be provided with a notch, or other engagement feature, that engages a shoulder element that prevents rotation of anti-torque plate 310 while still allowing vertical movement of anti-torque plate 310.

Although the above example is directed to a gas connection for a gas cooktop, the invention can also be applied to other external fluid connections such as, for example, water or air pipes, as well as other types of connections such as, for example, electrical conduits.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A pipe and connector assembly of a cooking appliance that uses a gas for a fuel for connecting the cooking appliance to an external supply of the gas, the assembly comprising:

a gas pipe connecting to a gas distribution manifold held in a chassis of the cooking appliance such that the manifold can move relative to the chassis, the movement of the manifold relative to the chassis being limited to a predetermined amount;

a transition section fluidly connected to the gas pipe;

a connector portion for connecting to the external supply of the gas by way of a twisting motion between the external supply of the gas and the connector portion, the connector portion being fixed to the transition section;

an anti-torque plate fixed rigidly to the transition section, the anti-torque plate having an engagement area;

a shoulder element for attaching the anti-torque plate to the chassis of the appliance, the shoulder element having
   a head;
   a shoulder portion adjacent to the head, the shoulder portion having a length along a longitudinal direction of the shoulder element; and
   a connection portion adjacent to the shoulder portion; and a fastener that engages the connection portion for connecting the shoulder element to the appliance chassis, wherein the shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion.

2. The assembly of claim 1, wherein the anti-torque plate is restrained in the plane that is parallel to the twisting motion by the shoulder portion engaging the engagement area such that the anti-torque plate has substantially no movement in the plane that is parallel to the twisting motion.

3. The assembly of claim 1, wherein the engagement area is a hole in the anti-torque plate.

4. The assembly of claim 1, wherein the shoulder element is a shoulder bolt and the fastener is a nut that threads onto the connection portion of the shoulder bolt.

5. The assembly of claim 1, wherein the connector portion is a threaded connection.

6. The assembly of claim 1, wherein the anti-torque plate is welded to the transition section.

7. The assembly of claim 1, wherein the shoulder portion of the shoulder element engages the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion when the gas pipe is connected to the gas distribution manifold.

8. A cooking appliance that uses a gas for a fuel, the appliance being for connecting to an external supply of the gas, the appliance comprising:
   a chassis;
   a gas distribution manifold held in the chassis such that the manifold can move relative to the chassis, the movement of the manifold relative to the chassis being limited to a predetermined amount;
   a pipe and connector assembly for connecting the appliance to the external supply of the gas, the assembly having
      a gas pipe connected to the manifold;
      a transition section fluidly connected to the gas pipe;
      a connector portion for connecting to the external supply of the gas by way of a twisting motion between the external supply of the gas and the connector portion, the connector portion being fixed to the transition section;
      an anti-torque plate fixed rigidly to the transition section, the anti-torque plate having an engagement area;
      a shoulder element that attaches the anti-torque plate to the chassis, the shoulder element having
         a head;
         a shoulder portion adjacent to the head, the shoulder portion having a length along a longitudinal direction of the shoulder element; and
         a connection portion adjacent to the shoulder portion; and
      a fastener that engages the connection portion to connect the shoulder element to the chassis,
   wherein the shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion.

9. The appliance of claim 8, wherein the anti-torque plate is restrained in the plane that is parallel to the twisting motion by the shoulder portion engaging the engagement area such that the anti-torque plate has substantially no movement in the plane that is parallel to the twisting motion.

10. The appliance of claim 8, wherein the engagement area is a hole in the anti-torque plate.

11. The appliance of claim 8, wherein the shoulder element is a shoulder bolt and the fastener is a nut that threads onto the connection portion of the shoulder bolt.

12. The appliance of claim 8, wherein the connector portion is a threaded connection.

13. The appliance of claim 8, wherein the anti-torque plate is welded to the transition section.

14. The appliance of claim 8, wherein the shoulder portion of the shoulder element engages the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion when the gas pipe is connected to the gas distribution manifold.

15. A method of limiting an amount of torque applied to a gas pipe that is a part of an appliance during the connection of an external supply of a gas fuel to the gas pipe, the method comprising:
   providing a transition section attached to the gas pipe;
   providing a gas distribution manifold attached to the gas pipe and held in a chassis of the appliance such that the manifold can move relative to the chassis, the movement of the manifold relative to the chassis being limited to a predetermined amount;
   providing a connector portion fixed to the transition section;
   providing an anti-torque plate attached to the transition section such that the transition section is rigidly fixed to the anti-torque plate, the anti-torque plate having an engagement area, the transition section being fluidly connected to the gas pipe;
   attaching the anti-torque plate to a chassis of the appliance by engaging a shoulder element with the engagement area in the anti-torque plate and attaching a fastener to the shoulder element, the shoulder element having a head and a shoulder portion adjacent to the head, the shoulder portion having a length along a longitudinal direction of the shoulder element; and
   attaching the external supply of the gas fuel to the connector portion by way of a twisting motion between the external supply of the gas fuel and the connector portion, the connector portion being fixed to the transition section;
   wherein the shoulder portion of the shoulder element is positioned to engage the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion.

16. The method of claim 15, wherein the anti-torque plate is restrained in the plane that is parallel to the twisting motion by the shoulder portion engaging the engagement area such that the anti-torque plate has substantially no movement in the plane that is parallel to the twisting motion.

17. The method of claim 15, wherein the engagement area is a hole in the anti-torque plate.

18. The method of claim 15, wherein the shoulder element is a shoulder bolt and the fastener is a nut that threads onto the connection portion of the shoulder bolt.

19. The method of claim 15, wherein the anti-torque plate is welded to the transition section.

20. The method of claim 15, wherein the shoulder portion of the shoulder element engages the engagement area of the anti-torque plate such that movement of the anti-torque plate in a plane that is parallel to the twisting motion is restrained by the shoulder portion engaging the engagement area, and movement of the anti-torque plate is permitted along the length of the shoulder portion when the gas pipe is connected to the gas distribution manifold.

* * * * *